United States Patent [19]

Nelson et al.

[11] Patent Number: 6,109,871
[45] Date of Patent: Aug. 29, 2000

[54] INTEGRATED FAN ASSEMBLY WITH VARIABLE PITCH BLADES

[75] Inventors: Chris Nelson, Edina; Dave Hennessy; Bradford Palmer, both of Minneapolis, all of Minn.

[73] Assignee: Horton, Inc., Minneapolis, Minn.

[21] Appl. No.: 08/829,060

[22] Filed: Mar. 31, 1997

[51] Int. Cl.$^7$ .............................. F04D 29/36; F04D 27/00
[52] U.S. Cl. ................................. 416/36; 416/31; 416/48; 416/61; 416/157 R; 416/167; 416/169 A; 416/170 R; 416/174; 416/60; 123/41.49; 324/174; 324/207.23
[58] Field of Search .................................. 416/36, 31, 44, 416/47, 48, 60, 61, 157 R, 168 R, 168 A, 164–167, 169 A, 170 R, 174, 219 A, 220 A; 123/41.12, 41.49; 73/494, 514.39, 119 R; 324/207.23, 207.25, 207.26, 173, 174, 166; 384/618, 619

[56] References Cited

U.S. PATENT DOCUMENTS

| | | |
|---|---|---|
| 1,456,699 | 5/1923 | Kramer . |
| 1,489,841 | 4/1924 | MacDonald . |
| 1,491,589 | 4/1924 | Dzus ..................................... 416/60 R |
| 1,496,496 | 6/1924 | Silick . |

(List continued on next page.)

FOREIGN PATENT DOCUMENTS

| | | |
|---|---|---|
| 1403104 | 10/1968 | Germany . |
| 19522840 | 1/1996 | Germany . |
| 57-46091 | 3/1982 | Japan ..................................... 416/167 |
| 58-211598 | 9/1983 | Japan . |
| 5187861 | 7/1993 | Japan . |
| 463006 | 11/1968 | Switzerland . |
| 640941 | 1/1984 | Switzerland . |
| 576046 | 3/1946 | United Kingdom ..................... 416/61 |
| 716389 | 10/1954 | United Kingdom ............... 416/168 R |
| 880281 | 10/1961 | United Kingdom ............... 416/168 R |
| 88/09447 | 12/1988 | WIPO ................................. 123/41.49 |
| 9009522 | 8/1990 | WIPO . |

OTHER PUBLICATIONS

Machinery's Handbook, 10th ed. New York, Industrial Press, 1939, p. 516.

Primary Examiner—Christopher Verdier
Attorney, Agent, or Firm—Alan Kamrath; Oppenheimer, Wolff & Donnelly, LLP

[57] ABSTRACT

A fan assembly (10) includes first and second housing sections (70, 72) which, when mated by a first set of fasteners, define a plurality of circumferentially spaced openings (162) that lead to an internal housing chamber (82). The fan assembly (10) also includes a plurality of blade units (140), each of which includes an integral support stem (142) having a journal portion (148) rotatably mounted within a respective one of the openings (162), an enlarged flange portion (144) and a radial post portion (138) rotatably supported by a hub member (106) within the internal chamber (82). Each blade unit (140) preferably has a thrust bearing (156), bushing sleeve (158) and fan blade (152) integrated with the support stem (142), with the fan blade (152) being preferably molded to the support stem (142) following positioning of the thrust bearing (156) and bushing sleeve (158) to form an integral component. The fan assembly (10) further includes an actuator member (112) that is movably supported within the internal housing chamber (82) and which is adapted to engage a pin (166) of the support stem (142) at a position offset from a rotational axis thereof to adjust the pitch of the fan blades (152). The fan assembly (10) is adapted to be attached to a drive device (12) with a portion (42) of the drive device (12) covering a first set of fasteners (78) such that the first and second housing sections (70, 72) can only be disassembled following detachment from the drive device (12). A sensing arrangement (58, 180) is also preferably provided to generate signals indicative of at least one of the pitch and rotating speed of the fan blades (152).

24 Claims, 2 Drawing Sheets

U.S. PATENT DOCUMENTS

| | | |
|---|---|---|
| 1,650,776 | 11/1927 | Stock . |
| 1,668,408 | 5/1928 | Johnson . |
| 1,856,578 | 5/1932 | Miquel et al. . |
| 1,857,319 | 5/1932 | Monroe ................................... 416/61 |
| 2,146,367 | 2/1939 | Berliner ................................ 416/167 |
| 2,479,668 | 8/1949 | Brandon et al. . |
| 2,880,809 | 4/1959 | Wagner . |
| 3,054,458 | 9/1962 | Marisco . |
| 3,294,175 | 12/1966 | Bodner . |
| 3,388,694 | 6/1968 | Elmer . |
| 3,505,982 | 4/1970 | Walter et al. . |
| 3,599,904 | 8/1971 | Condit et al. . |
| 3,647,320 | 3/1972 | Chilman et al. . |
| 3,731,515 | 5/1973 | Master et al. . |
| 3,844,680 | 10/1974 | Saterdal . |
| 3,853,427 | 12/1974 | Holt . |
| 3,860,361 | 1/1975 | McMurtry et al. . |
| 3,932,054 | 1/1976 | McKelvey .......................... 416/168 R |
| 4,037,986 | 7/1977 | Chilman . |
| 4,082,378 | 4/1978 | Gries . |
| 4,124,330 | 11/1978 | Barnes . |
| 4,187,056 | 2/1980 | Schwinn et al. . |
| 4,206,892 | 6/1980 | MacCready, Jr. et al. . |
| 4,219,310 | 8/1980 | Takata et al. . |
| 4,427,339 | 1/1984 | Witzel . |
| 4,461,340 | 7/1984 | Hart et al. . |
| 4,546,742 | 10/1985 | Sturges . |
| 4,619,586 | 10/1986 | Carter . |
| 4,789,305 | 12/1988 | Vaughen . |
| 4,792,279 | 12/1988 | Bergeron . |
| 4,924,161 | 5/1990 | Ueki et al. . |
| 4,927,329 | 5/1990 | Kliman et al. . |
| 4,990,205 | 2/1991 | Barbier et al. . |
| 5,022,821 | 6/1991 | Isert . |
| 5,122,034 | 6/1992 | Isert . |
| 5,207,557 | 5/1993 | Smiley, III et al. . |
| 5,209,640 | 5/1993 | Moriya ..................................... 416/36 |
| 5,259,729 | 11/1993 | Fujihira et al. . |
| 5,281,095 | 1/1994 | Komura et al. ........................ 416/167 |
| 5,284,420 | 2/1994 | Guimbal . |
| 5,403,161 | 4/1995 | Nealon et al. . |
| 5,482,584 | 1/1996 | Herrmann et al. . |
| 5,531,190 | 7/1996 | Mork . |

Fig 2

INTEGRATED FAN ASSEMBLY WITH VARIABLE PITCH BLADES

BACKGROUND OF THE INVENTION

The present invention pertains to cooling systems and, more particularly, to a fan assembly incorporating blades which may be adjusted to vary the pitch thereof in order to alter the air flow characteristics of the fan assembly. The invention is also directed to an improved blade unit for use in such a fan assembly, as well as a method of constructing the fan assembly.

Providing a fan assembly including a plurality of circumferentially spaced blades for developing a flow of air for cooling purposes is well known. Such fan assemblies are widely used in numerous fields, such as for cooling heat generating devices. For example, in the automotive art, fan assemblies are commonly used for engine cooling purposes. More specifically, a fan assembly is generally attached to a block of the internal combustion engine and is driven by the engine through a sheave and belt drive arrangement. The fan assembly mainly delivers a flow of air across a radiator and is incorporated as part of an overall, thermostatically controlled engine cooling system.

Since the fan assembly is driven by the engine, the rotating speed of the fan blades tracks the rpm's of the engine. However, the drive to the fan assembly typically incorporates a clutching mechanism such that the fan assembly either assumes an off condition, wherein no air flow is generated by the fan assembly, or an on condition, wherein the fan assembly is driven at a maximum rate established by the prevailing engine speed. With such an arrangement, a considerable initial load is placed on the drive system, particularly the belts, when the clutching mechanism is activated while the engine is running at a high rate of speed. Another problem associated with such typical engine cooling arrangements is that there is no control over the amount of power the fan assembly will use. Instead, the horsepower draw from the engine is always locked into a predetermined power versus fan speed relationship, i.e., power draw is cubic in relation to the rotating speed of the fan, while accounting for air density and temperature factors. This is particularly disadvantageous when cooling needs are low, but the fan assembly is still activated at a high speed. Furthermore, engaging the fan assembly can be a major source of noise, especially at low engine rpm's. For instance, when the engine is idling, noise generated by the engagement of the fan can be quite disturbing, with the majority of the noise being produced by the engagement of the frictional elements of the clutching mechanism.

Mainly due to the problems outlined above, variable speed fan assemblies, such as those incorporating viscous and eddy current-type fan clutches, and variable pitch fan assemblies have been developed. In general, variable speed fan assemblies are advantageous as the operating speed of the fan blades can be better correlated to the degree of cooling required. Of course, even variable speed fan assemblies still only provide a set air flow rate at any given fan operating speed. In addition, viscous drives cannot generally provide a fully "off" condition or a "maximum" air flow condition since they are continuously slipping. Here, variable pitch fan assemblies can be advantageously used since the pitch of the blades can be adjusted according to prevailing cooling requirements such that a reduced power draw from the engine can be achieved. Furthermore, variable pitch fan assemblies can be initially engaged in a smooth and quiet manner, even at low engine speeds, and can readily assume both off and full on conditions.

Although variable pitch fan assemblies can be adjusted to establish further enhanced air flow characteristics, problems exist in current designs, particularly regarding the ease of maintenance. For example, due to the connections needed to alter the pitch of the blades during use, the blades cannot be readily detached from the remainder of the fan assembly. In addition, the blades of prior art variable pitch fan assemblies have stems rotatably supported in outer housing openings only, typically through bearings that are connected to the stems. This arrangement can result in considerable force being exerted on concentrated portions of the housing, particularly during times of high speed operation. Furthermore, given that considerable force can act on the fan blades which tend to draw the blades radially outward, loosening and even separation of the blade stem from the bearings and housing can occur.

Based on the above, there exists a need for a fan assembly which is designed to establish optimal air flow rates, exhibits superior maintenance characteristics and provides an enhanced fan blade construction and mounting arrangement.

SUMMARY OF THE INVENTION

The present invention solves these and other deficiencies and problems related to fan assemblies by providing an improved variable pitch fan assembly particularly applicable for use in cooling internal combustion engines.

In accordance with the invention, the fan assembly is adapted to be easily attached to a drive device as a unit and may be readily adjusted during operation to alter air flow characteristics thereof. The fan assembly includes a housing formed from a plurality of mechanically connected housing sections having spaced inner walls so as to define an internal chamber, a plurality of blade units each of which is rotatably supported at circumferentially spaced locations by the housing, and an actuator member interconnected with the blade units such that movement of the actuator member relative to the housing adjusts the pitch of the blade units. By making the housing of several sections, the fan assembly can be readily disassembled for maintenance purposes. In addition, since the fan assembly is integrated, pre-assembly is simplified and the entire fan assembly can be easily attached to a drive device as a unit, preferably through another mechanical connection.

More specifically, the housing preferably includes first and second housing sections, which are interconnected through a first set of mechanical fasteners, and a cover member extending across a central opening formed in one of the housing sections. The housing is adapted to be attached to a drive device through the use of an additional set of mechanical fasteners, with the drive device covering the first set of mechanical fasteners such that access to the first set of mechanical fasteners is denied until the housing of the fan assembly is first detached from the drive device. When mated, the housing sections collectively form a plurality of circumferentially spaced, openings within which are rotatably supported journal portions of the blade units. A hub member, provided on one of the housing sections within the internal chamber, is formed with a plurality of circumferentially spaced pockets which are aligned with the openings and rotatably support post portions of the blade units. Therefore, each blade unit is advantageously supported at two radially spaced locations.

In accordance with a preferred embodiment of the invention, each of the blade units is formed as a single unit. More specifically, each blade unit includes a support stem defined by a respective post portion, an enlarged flange portion, a raised diametric portion, a respective journal portion, an extension element and a fan blade. The post, flange, raised diametric and journal portions, as well as the extension element, are initially formed as an integral component and the fan blade is molded directly upon the extension element. Prior to this molding operation, a thrust bearing is preferably positioned about the raised diametric portion and a bushing sleeve, sized to be clamped within one of the openings formed upon mating the housing sections, is placed about the journal portion. With this construction, the entire blade unit, including the thrust bearing and bushing sleeve, constitutes a single assembly component.

Although various actuator arrangements could be employed, the actuator member preferably constitutes a piston that is adapted to be linearly shifted within the internal chamber such as by introducing a fluid medium therein through the cover member. A diaphragm is advantageously incorporated between the cover member and the piston to minimize drag and facilitate precise piston movement. The piston is interconnected to each of the fan blade support stems such that movement of the piston relative to the housing causes the blade units to rotate to vary the pitch of the fan blades. The force generated by the introduction of the fluid medium to shift the piston must overcome a biasing force exerted on the piston tending to set the fan blades in a maximum air flow pitch. In the preferred embodiment, the fan assembly also has associated therewith a sensing unit for signaling at least one of the rate of rotation and pitch of the fan blades. Such a sensing unit may take various forms and signals therefrom are preferably delivered to a control unit for use in establishing the optimum blade pitch based on current operating parameters.

It is thus an object of the present invention to provide a variable pitch fan assembly formed from multiple, interconnected housing sections which support various components such that an integrated unit is provided to facilitate its attachment to a drive device, as well as its removal therefrom for ease of maintenance.

It is another object of the present invention to provide a fan assembly that incorporates unique blade units, with each blade unit including a support stem that carries a thrust bearing and a bushing sleeve and upon which is molded a fan blade, such that the entire blade unit is constituted by a single component for ease of assembly and replacement.

It is a further object of the invention to rotatably support each blade unit at two radially spaced housing locations in order to effectively distribute reaction forces to the housing during operation of the fan assembly.

It is a still further object of the invention to provide an arrangement for sensing at least one of the pitch and rotational speed of the blade units in order to accurately control the operation of the fan assembly.

Additional features and advantages of the fan assembly of the present invention and its method of assembly will become more readily apparent from the following detailed description of the preferred embodiment thereof when taken in conjunction with the drawings wherein like reference numerals refer to corresponding parts in the several views.

At this point, it should be noted that all of these figures are drawn for ease of explanation of the basic teachings of the present invention only; the extension of the figures with respect to the number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength and similar requirements will likewise be within the skill of the art after the following teachings of the present invention have been read and understood.

Furthermore, when the terms "first", "second", "inner", "outer", "radially", "axially", "circumferentially" and similar terms are used herein, it should be understood that these terms have reference only to the structure shown in the drawings as it would appear to a person viewing the drawings and are utilized only to facilitate describing the invention.

DETAILED DESCRIPTION

The preferred embodiment of a fan assembly according to the preferred teachings of the present invention is shown in the drawings and generally designated 10. In its most preferred form, fan assembly 10 is particularly adapted for use in connection with cooling an internal combustion engine of a vehicle, but other applications for fan assembly 10 of the invention will become readily apparent. Therefore, in the preferred application of the invention, fan assembly 10 is shown attached to a drive unit 12 that includes a sheave 14 rotatably mounted through a pair of bearing units 16 and 18 to a stub shaft 20 of a journal bracket 22 (see FIG. 2). Journal bracket 22 also includes a flange portion 24 that is formed integral with stub shaft 20 and which is provided with a plurality of holes 26 for use in fixedly securing journal bracket 22 to an engine block or the like (not shown).

Figure 2:
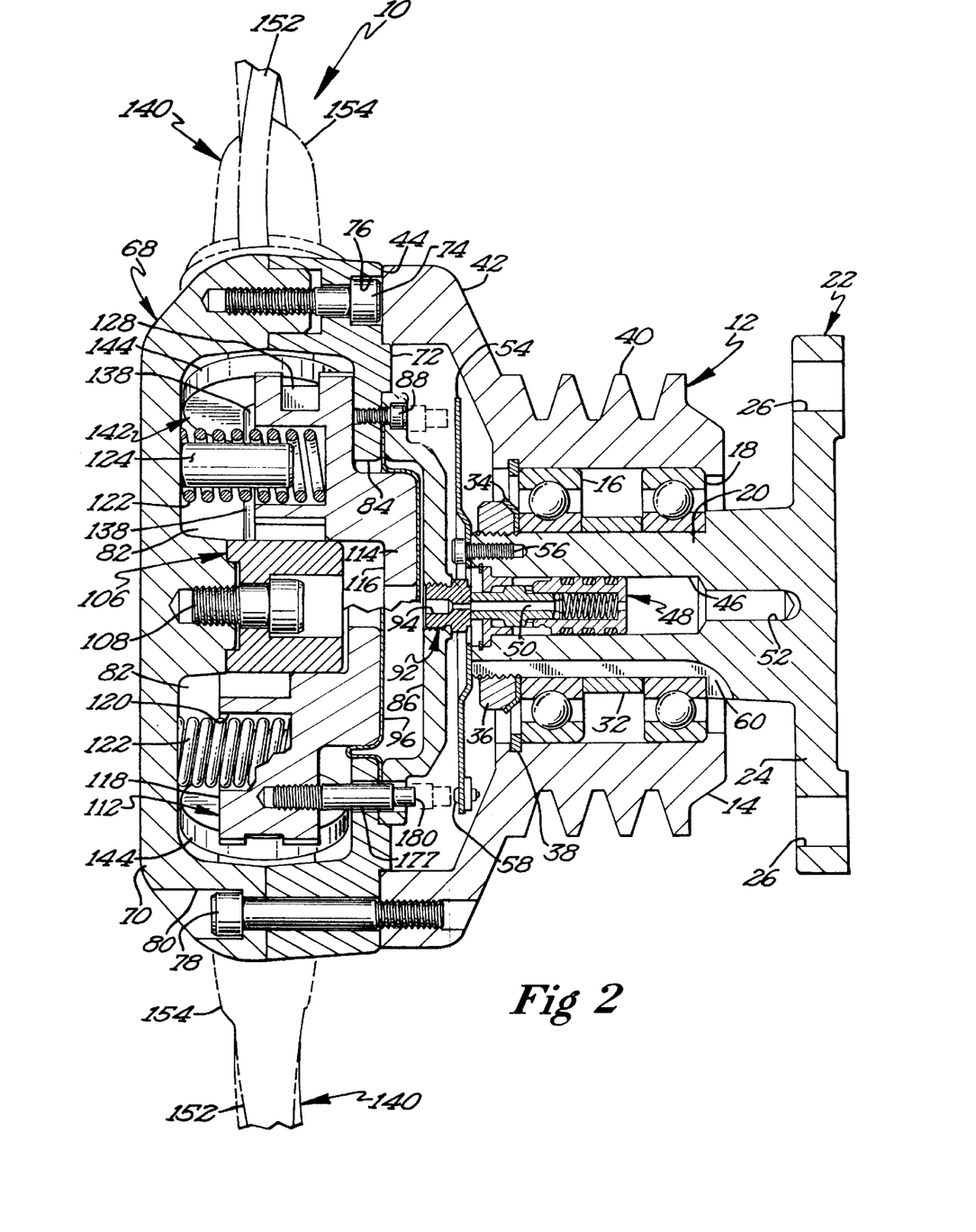
FIG. 2 is a cross-sectional view of the fan assembly according to section line 2—2 of FIG. 1 and illustrating the mounting of the fan assembly to a drive device with an actuator member shown in one extreme operating position in the top half of the figure and in another extreme operating position in the lower half.

More specifically, bearing units 16 and 18 are press-fit to sheave 14 and stub shaft 20 and are axially separated by a spacer ring 32. The inner races (not separately labeled) of bearing units 16 and 18 are axially maintained on stub shaft 20 by means of a washer 34 and a nut 36 that is threaded onto a terminal end portion of stub shaft 20. Outer races (also not separately labeled) of bearing units 16 and 18 are press-fit against sheave 14 and are retained in a desired axial position by their engagement with sheave 14 and the presence of a retainer ring 38.

Sheave 14 is formed with an outer grooved surface section 40 that is adapted to receive a drive belt that is driven by the internal combustion engine. With this arrangement, sheave 14 is constantly driven during running of the engine. Although various arrangements could be incorporated to vary the relative rotational speeds (drive ratio) between the engine and the sheave, such as by simply altering the relative size of the sheave from the drive shaft, in the preferred embodiment, sheave 14 is preferably driven at a 1:1 ratio with the engine. For reasons which will become evident below, sheave 14 also includes a generally frustoconical annular drive ring 42 having a terminal axial surface 44.

As shown in this figure, stub shaft 20 is formed with an internal bore 46 within which is positioned a fluid supply coupling 48. In general, fluid supply coupling 48 takes the form of a cartridge that is known in the art and therefore will not be detailed here. However, it should be noted that fluid supply coupling 48 includes an internal passage 50 that is adapted to receive a supply of pressurized fluid delivered through an inlet passage 52 formed in journal bracket 22.

Stub shaft 20 has attached thereto a plate 54 by means of fasteners 56. Plate 54 carries at least one sensor 58 which, in the preferred embodiment, is adapted to sense at least one of a blade pitch and an operating speed of fan assembly 10 in the preferred form as will be further detailed below. At this point, although not shown in FIG. 2, it should be recognized that sensor 58 is adapted to be electrically interconnected with a control unit by means of a plurality of wires that are fed to sensor 58 through an axial groove 60 formed in stub shaft 20.

Figure 3:
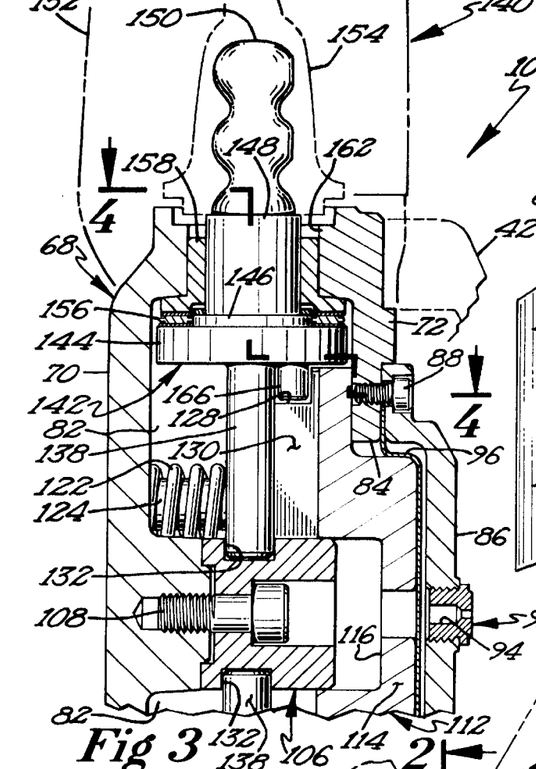
FIG. 3 is a cross-sectional view of the fan assembly according to section line 3—3 of FIG. 1.

As best shown in FIGS. 2 and 3, fan assembly 10 includes a housing 68 formed from first and second housing sections 70 and 72 which are adapted to be interconnected at spaced peripheral locations by means of a plurality of first threaded fasteners 74 (see FIG. 2). In the preferred embodiment, fasteners 74 extend entirely through second housing section 72 and are threaded to first housing section 70 while head portions of fasteners 74 are received in countersunk through holes 76 formed in second housing section 72. Fan assembly 10 is adapted to be attached to sheave 14 by means of a second set of threaded fasteners 78. More specifically, first and second housing sections 70 and 72 are formed with a plurality of aligned through holes 80 which are spaced between countersunk through holes 76 and receive fasteners 78 for connecting fan assembly 10 to annular drive ring 42 with axial surface 44 of annular drive ring 42 covering the heads of fasteners 74. With this arrangement, access to fasteners 74 is only permitted following detachment of fan assembly 10 from sheave 14.

Housing sections 70 and 72 have spaced inner wall portions (not labeled) that define therebetween an internal housing chamber 82. Second housing section 72 is formed with a central opening 84 that leads into internal housing chamber 82. A cover member 86 extends across central opening 84 and is secured to second housing section 72 by various, circumferentially spaced fasteners 88. Cover member 86 is provided with a central aperture within which is threadably secured a coupling 92 having a fluid passage 94. When fan assembly 10 is secured to sheave 14, fluid passage 94 is aligned with internal passage 50 of fluid supply coupling 48 such that pressurized fluid delivered to inlet passage 52 can flow into internal housing chamber 82 through fluid supply coupling 48 and coupling 92. A flexible diaphragm 96 is positioned within internal housing chamber 82 adjacent cover member 86, with diaphragm 96 having an annular peripheral portion sealingly interposed between second housing section 72 and cover member 86. With this arrangement, the flow of pressurized fluid into internal housing chamber 82 will act upon diaphragm 96 to deflect the same as will be more fully discussed below.

Attached to first housing section 70, within internal housing chamber 82, is a hub member 106. In the preferred embodiment, hub member 106 is formed separate from first housing section 70 and is secured thereto by means of a recessed bolt 108. Hub member 106 has an outer, preferably cylindrical surface which is adapted to guidingly receive an actuator member 112. In the preferred embodiment, actuator member 112 is constituted by a piston having an end plate portion 114 formed with a cavity 116 opposite hub member 106 and an outwardly extending plate portion 118. Outwardly extending plate portion 118 is provided with various spaced bores 120 (see FIGS. 1, 2 and 4) which are adapted to receive springs 122 for biasing actuator member 112 towards cover member 86. Springs 122 are maintained in a desired alignment by extending about studs 124 which project into internal housing chamber 82 from first housing section 70.

Figure 1:
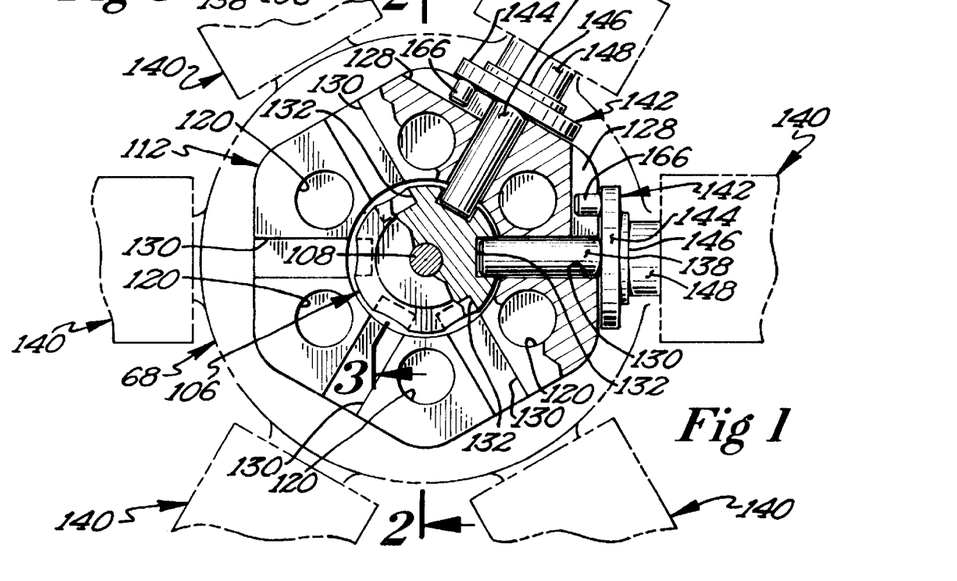
FIG. 1 is a partial cross-sectional front view of the fan assembly of the present invention particularly illustrating mounting features of the blade units.

Actuator member 112 is preferably multi-faceted as best shown in FIG. 1 and each face thereof is formed with a peripheral slot 128 that leads to a radially extending groove 130. Each radially extending groove 130 is aligned with a respective recessed pocket 132 formed in hub member 106 (see FIGS. 1 and 3). Received within an aligned radial groove 130 and recessed pocket 132 is an elongated post portion 138 of a blade unit 140. Elongated post portion 138 actually forms part of an integrally formed support stem 142 of blade unit 140. Support stem 142 also includes an enlarged flange portion 144, a raised diametric portion 146, a journal portion 148 and an extension portion 150 (see FIG. 3). Support stem 142 is preferably integrally formed of metal, however, other materials could be readily employed. In any event, support stem 142 is formed of a homogeneous material throughout without separation lines, breaks or the like for superior structural integrity. For instance, support stem 142 can be formed by casting as a single element in a single mold cavity or by machining from a single block of material such that no fasteners, welds or other connections exist that could break or vibrate loose.

Each blade unit 140 further includes a fan blade 152 having a base 154 that is mounted upon extension element 150. In the preferred embodiment, fan blade 152 is formed of plastic and is molded upon extension element 150. Prior to molding of fan blade 152, a thrust bearing 156 (FIG. 3) is positioned upon enlarged flange portion 144 and about raised diametric portion 146. In addition, a bushing sleeve 158 is mounted about journal portion 148 and engages thrust bearing 156. Therefore, once thrust bearing 156 and bushing sleeve 158 are mounted upon support stem 142 and fan blade 152 is molded upon extension element 150, the entire blade unit 140 defines an integral unit.

Blade units 140 are adapted to be mounted in circumferentially spaced openings 162 formed in housing 68. Although the specific number of blade units 140 can vary in accordance with the invention, an equal number of diametrically opposed blade units 140 are preferably provided for dynamic balancing purposes. In the preferred embodiment, each opening 162 is actually formed upon mating of first and second housing sections 70 and 72 as best shown in FIG. 3. Therefore, each housing section 70 and 72 defines an arcuate portion of a respective opening 162. As clearly shown in this figure, each blade unit 140 is mounted with bushing sleeve 158 clamped between first and second housing sections 70 and 72 while post portion 138 extends through radial groove 130 and into a respective recessed pocket 132. With this construction, each blade unit 140 is rotatably supported by both hub member 106 and housing 68 at opening 162 through bushing sleeve 158. By providing these radially spaced support locations, forces acting upon blade units 140 during operation of fan assembly 10 can be effectively distributed, with the mounting of post portion 138 in pocket 132 and bushing sleeve 158 in opening 162 aiding in distributing bending forces and with flange portion 144 reacting radial forces through a portion of bushing sleeve 158 and thrust bearing 156. Although hub member 106 can be formed from various materials, bearing bronze is preferably utilized such that hub member 106 itself acts as a bearing to minimize the number of necessary parts.

Figure 4:
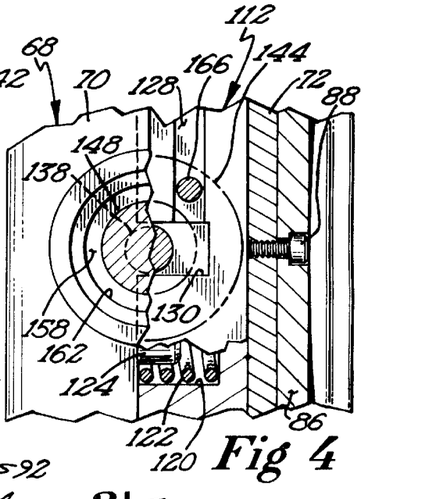
FIG. 4 is a partial cross-sectional view of the fan assembly generally taken along section line 4—4 of FIG. 3.

The enlarged flange portion 144 of each support stem 142 is formed with a hole (not labeled) that is eccentric or offset from a longitudinal rotational axis defined by post portion 138 and journal portion 148. Each hole has secured therein a pin 166 which projects into a corresponding slot 128 formed in actuator member 112. Of course, it should be realized that pin 166 could also be integrally formed with flange portion 144. In addition, a bushing (not shown), preferably formed of a lubrication impregnated polymer, could be placed over pin 166 and received in a respective slot 128. In any event, linear shifting of actuator member 112 within internal housing chamber 82 by the introduction of pressurized fluid through fluid passage 94 causes rotation of each blade unit 140 about the longitudinal axis defined by both post portion 138 and journal portion 148 through the interengagement between actuator member 112 and pin 166. More specifically, as best shown in FIG. 4, since pin 166 is positioned within slot 128 which extends perpendicular to the movement of actuator member 112 and parallel to but spaced from a longitudinal axis defined by post portion 138, linear movement of actuator member 112 will cause the pins 166 to rotate about the longitudinal axis of post portion 138 to cause rotation of blade units 140. This rotation of blade unit 140 effectively adjusts the pitch of fan blade 152, thereby altering the air flow characteristics of fan assembly 10. Of course, this shifting of actuator member 112 away from cover member 86 (see lower half of FIG. 2) is performed against the biasing force developed by springs 122, as the biasing force tends to place fan blades 152 in a maximum flow position. The extension of actuator member 112 is limited in the preferred embodiment shown by abutment with terminal ends of studs 124.

With reference to FIG. 2, second housing section 72 and cover member 86 are formed with aligned apertures (not labeled) through which is adapted to extend a respective shaft 177. One end of each shaft 177 is fixed for movement with actuator member 112 relative to housing 68, such as through a threaded connection, and a second end of shaft 177 is preferably provided with a magnet 180. Magnet 180 operates in conjunction with sensor 58 to signal at least one of the pitch of fan blades 152 and the rotational speed thereof. More specifically, sensor 58 functions to sense the presence and strength of the magnetic field generated by magnet 180. As the distance between magnet 180 and sensor 58 directly correlates with the pitch of the fan blades 152 and the timing between passes of the magnet 180 by sensor 58 reflects the operating speed of fan assembly 10, this simple sensing arrangement can provide multiple signals to a control unit for use in regulating the flow of pressurized fluid into internal housing chamber 82.

In accordance with the invention, fan assembly 10 is constructed by initially attaching each shaft 177 (actually one or more can be provided) to actuator member 112. Then, while holding hub member 106 within cavity 116 of actuator member 112, one blade unit 140 is positioned such that pin 166 extends into slot 128 and the terminal end of post portion 138 is placed within a respective pocket 130. Of course, as indicated above, blade unit 140 is constituted by an integrated assembly with support stem 142 being integrally formed with extension element 150, journal portion 148, raised diametric portion 146, enlarged flange 144 and post portion 138, thrust bearing 156 and bushing sleeve 158 being mounted upon support stem 142 and base 154 of fan blade 152 being molded about extension element 150. Once one blade unit 140 has been connected to actuator 112 and hub member 106, hub member 106 can be released and the remaining blade units 140 can be connected in the same manner. After all of the blade units 140 have been properly inserted, each of the blade units 140, actuator member 112 and hub member 106 are simultaneously positioned within second housing section 72, while aligning each shaft 177 with a respective aperture formed in second housing section 72. At this point, it should be noted that cover member 86, diaphragm 96 and fasteners 88 are not yet attached to second housing section 72. After positioning springs 122 in bores 120 of actuator member 112, first housing section 70 is mated with first housing section 72, with studs 124 being received within springs 122 and each of the mating surfaces of first and second housing sections 70 and 72 collectively defining openings 162 which clamp upon bushing sleeve 158. The mating of first and second housing sections 70 and 72 require springs 122 to be compressed such that there exists a tendency for the housing 68 to come apart. While holding the first and second housing sections 70 and 72 together, fasteners 74 are positioned in through holes 76 and secured within first housing section 70. Next, fastener 108 is tightened through a central bore (not labeled) formed in actuator member 112 (see FIG. 3). Thereafter, diaphragm 96 and cover member 86 are secured by means of fasteners 88. Finally, coupling 92 is installed.

As clearly shown in FIG. 3, at least a portion of bushing sleeve 158 and enlarged flange portion 144 for each blade unit 140 have associated diameters which are larger than the corresponding opening 162. Therefore, support stem 142 cannot pass through opening 162, without the occurrence of major structural damage. With this arrangement, radial loads developed during operation of fan assembly 10 are transmitted to housing 68 through enlarged flange portion 144, thrust bearing 156 and part of bushing sleeve 158 (see FIG. 3). In addition, given that enlarged flange portion 144 is formed integral with post portion 138 and the remainder of support stem 142, flange portion 144 cannot be undesirably shifted relative to post portion 138, thus preventing support stem 142 from escaping from housing 68, as is known in prior art devices having separate flange portions, when large radial forces are developed during operation of fan assembly 10. Finally, fasteners 88 are used to secure cover member 86 to second housing section 72 with diaphragm 96 positioned therebetween. This step can be performed with coupling 92 pre-attached to cover member 86 or coupling 92 can be subsequently secured in position.

As fan assembly 10 is particularly adapted for use in cooling an internal combustion engine, the preferred construction of drive unit 12 enables assembly thereof by initially press-fitting bearing units 16 and 18 into sheave 14 and attaching retaining ring 38. At least one wire lead is positioned in groove 60 for sensor 58. Stub shaft 20 of journal bracket 22 is then pressed into bearing units 16 and 18 and secured by means of washer 34 and nut 36. Fluid supply coupling 48 is inserted into bore 46 and captured by a retaining ring (shown in FIG. 2 but not separately labeled). Plate 54 with sensor 58 is then attached to journal bracket 22 by fasteners 56.

As indicated above, journal bracket 22 is adapted to be secured to a block portion of the engine at holes 26 of flange portion 24. A drive belt from the engine is then placed around sheave 14 and properly tensioned. Housing 68 of fan assembly 10 can then be readily attached to sheave 14 by means of fasteners 78 for concurrent rotary movement. Since housing 68 is not attached to sheave 14 until after a drive belt is placed about sheave 14, belt installation is simplified. Again, upon securing housing 68 to sheave 14, axial surface 44 of annular drive ring 42 covers fasteners 74. This arrangement advantageously assures that housing 68 cannot be disassembled without first disconnecting housing 68 from drive unit 12. This is important since, as indicated above, springs 122 are compressed upon assembly of housing 68 such that inadvertent removal of fasteners 76 could not only cause the entire fan assembly 10 to come apart, but serious injuries could be caused to those nearby. However, since fasteners 74 are covered by annular drive ring 42, fasteners 74 cannot be inadvertently removed. Of course, fan assembly 10 can be readily removed from sheave 14 for repair and maintenance purposes with fasteners 78 being readily visible and accessible for this purpose. If a blade unit 140 is in need of repair, housing 68 can simply be detached from sheave 14, without having to remove journal bracket 22 from the engine chassis, opened and a new blade unit 140 can be substituted for the damaged unit. Since the various components of each blade unit 140 are integrated into a single unit, replacement is simple and efficient.

Now that the basic teachings of the fan assembly according to the preferred embodiment of the present invention has been set forth, other variations will be obvious to the persons skilled in the art. For example, although the pitch of fan blades 152 are adjusted through the use of a fluid pressure driven actuation system, various actuation systems, including mechanical, electrical, hydraulic and pneumatic systems, could be employed. Therefore, actuator member 112 can take various forms other than a piston while still accomplishing the desired function described above. In addition, the mounting of actuator member 112 can be modified to even induce reverse flow by simply expanding its permissible degree of travel. It should also be realized that fan blades 152 can assume various shapes, such as providing a twist to increase the efficiency of the airfoil without compromising the articulation of the blade which provides for infinitely variable cooling capacities between a zero capacity to a maximum value based on engine/fan speed. Furthermore, the sensing arrangement is not intended to be limited to the specific embodiment described. Rather, various types of known speed and position sensors could be employed, including other types of capacitive-type sensors. In addition, it should be realized that the sensing arrangement of the invention could be utilized in other rotational control apparatus as well, such as clutches. Finally, various materials could be used to form the components of fan assembly 10, including various metals and plastics. Particularly advantageous is the formation of first and second housing sections 70 and 72, as well as actuator member 112, of plastic to reduce weight and cost factors.

Thus the invention disclosed herein may be embodied in other specific forms without departing from the spirit or general characteristics thereof and the embodiment described herein which should be considered in all respects illustrative and not restrictive. The scope of the invention is to be indicated by the appended claims, rather than by the foregoing description, and all changes which come within the meaning and range of equivalence of the claims are intended to be embraced therein.

We claim:

1. In an assembly including a housing drivingly connected to a drive unit for rotation about a first axis and an actuator member mounted within the housing for concurrent rotation with the housing about the first axis and axial movement relative to the housing along the first axis through indefinitely variable positions in order to selectively control an operating parameter of the assembly, a sensing system comprising, in combination: a first sensor element attached to the actuator member so as to both rotate in unison with the actuator member about the first axis and to shift in unison with the actuator member along the first axis; and a second sensor element fixed to the drive unit, with the second sensor element being adapted to sense both a rotational condition of the first sensor element about the first axis and a degree of shifting of the first sensor element in order to develop signals indicative of a rotating speed and axial position of the actuator member.

2. The sensing system of claim 1, further comprising, in combination: a plurality of working members connected to the housing for concurrent rotation with the housing about the first axis and rotation relative to the housing about a second axis arranged substantially perpendicular to the first axis to adjust a relative angular position between the housing and the working members, with the actuator member being interengaged with each of the working members such that axial shifting of the actuator member relative to the housing causes the working members to rotate about the second axis, such that the developed signals are also indicative of a rotating speed of the working members and the relative angular position between the housing and the working members.

3. The sensing system of claim 2, wherein the working members constitute fan blade units which are rotated to adjust a pitch of the fan blade units, thereby altering an air flow operating parameter of the assembly.

4. The sensing system of claim 1, wherein the first sensor element constitutes a magnet secured to the actuator member and the second sensor element is adapted to receive signals indicative of the presence and relative positioning of the magnet.

5. A fan assembly adapted to be readily removably attached, as a unit, to a drive device, comprising, in combination: a housing including first and second interconnected housing sections, with the first and second housing sections having inner wall portions which are spaced so as to define an internal housing chamber, with at least one of the first and second housing sections including a plurality of circumferentially spaced openings formed in a peripheral portion thereof; a plurality of first fasteners interconnecting the first and second housing sections at first, circumferentially spaced locations; a plurality of blade units, with each of the blade units including a support stem being mounted in a respective one of the openings; and a plurality of second fasteners for removably attaching the housing to the drive unit, with access to the plurality of first fasteners being adapted to be blocked by the drive unit such that disassembly of the first and second housing sections is only permitted upon detaching the housing from the drive unit.

6. The fan assembly of claim 5, wherein the plurality of first fasteners extend through the second housing section and into the first housing section, with the second housing section being adapted to abut the drive unit, and the plurality of second fasteners extend through each of the first and second housing sections for connecting the housing to the drive unit.

7. The fan assembly of claim 6, wherein the fan assembly is adapted to be attached to the drive device including a sheave, with a portion of the sheave covering the plurality of first fasteners when the fan assembly is attached to the drive device.

8. The fan assembly of claim 7, wherein the support stem of each of the blade units is rotatably mounted in a respective one of the openings and the fan assembly further comprises, in combination: an actuator member movably mounted within the internal housing chamber, with the actuator member being interconnected with the support stem of each of the blade units such that movement of the actuator member relative to the housing causes the blade units to rotate relative to the housing to vary a pitch of the blade units, thereby altering the air flow characteristics of the fan assembly.

9. The fan assembly of claim 8, wherein the actuator member is constituted by a piston and the fan assembly further comprises, in combination: a passage formed in the housing for introducing a fluid medium therein for shifting of the piston and a flexible diaphragm positioned within the housing, between the piston and the passage.

10. The fan assembly of claim 5, further comprising, in combination: a hub member extending from the housing at a position spaced radially from the openings, with the hub member including circumferentially spaced pockets, and wherein each support stem includes a cylindrical journal portion rotatably mounted in a respective one of the openings; a post portion which extends from the journal portion, with the post portion including a terminal end portion adapted to be rotatably mounted in a respective one of the pockets such that each blade unit is supported at two, radially spaced locations for rotation relative to the housing to vary a pitch of the blade units, thereby altering the air flow characteristics of the fan assembly; and a flange portion interposed between the journal portion and the post portion, with the flange portion being sized larger than the opening within which the journal portion is rotatably mounted, with the support stem being formed as an integral member such that the journal, flange and post portions constitute a single unit.

11. The fan assembly of claim 10, wherein each blade unit farther comprises, in combination: a bushing sleeve interposed between the journal portion and the opening and a thrust bearing arranged between the flange portion and the housing, with each blade unit being integrated into a single, replaceable unit with the support stem receiving the thrust bearing and bushing sleeve and a base of a fan blade being molded to the support stem to integrally retain the thrust bearing and bushing sleeve between the flange portion and the fan blade.

12. A fan assembly adapted to be rotated by a drive device and adapted to be adjusted during operation to alter the air flow characteristics of the fan assembly, comprising, in combination; a housing having a peripheral portion formed with a plurality of circumferentially spaced openings; a hub member extending from the housing at a position spaced radially from the openings, with the hub member including a plurality of circumferentially spaced pockets, with each of the pockets being aligned with a respective one of the openings; an actuator member shiftably mounted relative to the housing; and a plurality of blade units, with each of the blade units including a support stem and a fan blade having a base attached to the support stem, with the support stem of each blade unit including a cylindrical journal portion rotatably mounted in a respective one of the openings and a post portion which extends from the journal portion, along a common longitudinal axis, with the post portion including a terminal end rotatably mounted in a respective one of the pockets such that each blade unit is supported at two, radially spaced locations for rotation relative to the housing to vary a pitch or the fan blades, thereby altering the air flow characteristics of the fan assembly, with the actuator member being interconnected with the support stem of each of the blade units such that movement of the actuator member relative to the housing causes the fan blades to rotate relative to the housing to vary the pitch of the fan blades, with the actuator member being constituted by a piston having a central recess portion into which the hub member including the plurality of circumferentially spaced pockets extends for linearly guiding the piston for movement relative to the housing, with the piston including a plurality of radially extending grooves aligned with the plurality of circumferentially spaced pockets included in the hub member, with the support stems of the blades being received in the radially extending grooves of the piston.

13. The fan assembly of claim 12, wherein the hub member is formed separate from and attached to the housing.

14. The fan assembly of claim 12, wherein the support stem for each blade unit further includes an enlarged flange portion interposed between the journal portion and the post portion, with the flange portion being sized larger than the opening within which the journal portion is rotatably mounted, with the support stem being formed as an integral member such that the journal, flange and post portions constitute a single unit.

15. The fan assembly of claim 14, wherein each blade unit further comprises, in combination: a bushing sleeve interposed between the journal portion and the opening and a thrust bearing arranged between the flange portion and the housing.

16. The fan assembly of claim 15, wherein each blade unit is integrated into a single, replaceable unit with the support stem receiving the thrust bearing and bushing sleeve and the base of the fan blade being molded to the support stem to integrally retain the thrust bearing and bushing sleeve between the flange portion and the fan blade.

17. The fan assembly of claim 12, further comprising, in combination: means for sensing the pitch and rotating speed of the blade units during operation of the fan assembly.

18. The fan assembly of claim 12, further comprising, in combination: a plurality of springs extending between the actuator member and the housing for biasing the actuator member.

19. The fan assembly of claim 18, further comprising, in combination: a passage formed in the housing for introducing a fluid medium for shifting of the piston against the bias of the plurality of springs.

20. The fan assembly of claim 18, further comprising, in combination: a plurality of studs extending axially from the housing, with the springs extending about the studs and with the studs including ends, spaced from the housing, which are adapted to be engaged by the actuator member to limit a permissible axial displacement of the actuator member relative to the housing.

21. A fan blade unit adapted to be rotatably mounted as an integrated, one-piece assembly within an opening formed in a housing of a fan assembly having air flow characteristics which can be altered during operation by adjusting a pitch of the fan blade unit, comprising, in combination: an integrally formed support stem including a cylindrical journal portion adapted to be rotatably mounted within the opening formed in the housing, a post portion extending, along a common longitudinal axis, from the journal portion and including a terminal end spaced, along the longitudinal axis, from the journal portion and an enlarged flange portion interposed between the journal portion and the post portion, with the flange portion being adapted to be sized diametrically larger than both the post portion and the opening within which the journal portion is rotatably mounted, with the terminal end of the post portion having a shape and size adapted to be rotatably supported by the housing at a position spaced from the opening within which the journal portion is rotatably mounted; a pin member projecting from the flange portion at a position offset from the post portion and from the common longitudinal axis wherein, when the fan blade unit is mounted for rotation about the journal portion and the post portion, the pin member can be engaged to cause the support stem to rotate about the common longitudinal axis to vary the pitch of the fan blade; and a fan blade having a base portion formed about the support stem such that the support stem and the fan blade constitute an integrated assembly adapted to be mounted to the housing as a single unit.

22. The fan blade unit of claim 21, wherein the post portion has an associated diametric size which is smaller than that of the journal portion.

23. The fan blade unit of claim 21, further comprising, in combination: a bushing sleeve mounted about the journal portion and a thrust bearing arranged between the flange portion and the bushing sleeve, with the bushing sleeve and thrust bearing being positioned on the support stem prior to forming the base portion of the fan blade about the support stem such that the thrust bearing and bushing sleeve form part of the integrated assembly.

24. A fan assembly adapted to be removably attached, as a unit, to a drive unit and adapted to be adjusted during operation to alter air flow characteristics of the fan assembly, comprising, in combination: a housing drivingly connected to the drive device for rotation about a first axis, with the housing including first and second interconnected housing sections having inner wall portions which are spaced so as to define an internal housing chamber, with the housing including a plurality of circumferentially spaced openings formed in a peripheral portion thereof, with each housing section defining an arcuate portion of each opening; a hub member extending from one of the first and second housing sections, within the internal housing chamber, at a position spaced radially from the openings, with the hub member including a plurality of circumferentially spaced pockets, with each of the pockets being aligned with a respective one of the openings; a plurality of integrated, one-piece blade units, with each of the blade units including an integrally formed support stem and a fan blade having a base formed about the support stem such that the support stem and the fan blade constitute an integrated assembly adapted to be mounted to the housing as a single unit, with the support stem of each blade unit including a cylindrical journal portion rotatably mounted in a respective one of the openings, a post portion which extends from the journal portion, along a common longitudinal axis, and includes a terminal end rotatably mounted in a respective one of the pockets such that each blade unit is supported at two, radially spaced locations for rotation relative to the housing to vary a pitch of the fan blades, thereby altering the air flow characteristics of the fan assembly, and an enlarged flange portion interposed between the journal portion and the terminal end of the post portion, with the flange portion being diametrically sized larger than both the post portion and the opening within which the journal portion is rotatably mounted; an actuator member mounted within the housing for concurrent rotation with the housing about the first axis and axial movement relative to the housing along the first axis through indefinitely variable positions, with the actuator member being connected to each of the blade units such that selective axial movement of the actuator member controls the pitch of the fan blades; a plurality of first fasteners interconnecting the first and second housing sections at first, circumferentially spaced locations; a plurality of second fasteners for removably attaching the housing to the drive unit, with access to the plurality of first fasteners being adapted to be blocked by the drive unit such that disassembly of the first and second housing sections is only permitted upon detaching the housing from the drive unit; and a sensing system including a first sensor element attached to the actuator member so as to both rotate in unison with the actuator member about the first axis and to shift in unison with the actuator member along the first axis and a second sensor element fixed to the drive unit, with the second sensor element being adapted to sense both a rate of rotation of the first sensor element about the first axis and a degree of shifting of the first sensor element in order to develop signals indicative of a rotating speed and axial position of the actuator member which, in turn, correspond to a rotating speed and pitch of the blade units.

\* \* \* \* \*